July 29, 1969 L. W. WELLS 3,458,251
MOTION PICTURE PROJECTOR

Filed April 8, 1966 7 Sheets-Sheet 1

INVENTOR
LEON W. WELLS
BY
Lyon & Lyon
ATTORNEYS

INVENTOR
LEON W. WELLS
BY Lyon & Lyon
ATTORNEYS

United States Patent Office 3,458,251
Patented July 29, 1969

3,458,251
MOTION PICTURE PROJECTOR
Leon W. Wells, Closter, N.J., assignor to Panopix Research Inc., New York, N.Y., a corporation of New York
Filed Apr. 8, 1966, Ser. No. 541,196
Int. Cl. G03b 31/02, 31/00
U.S. Cl. 352—29                                    20 Claims

ABSTRACT OF THE DISCLOSURE

A projector for film with plural rows of pictures and sound tracks with story sequence proceeding in opposite directions in adjacent rows. The projector feeds the film past a sound pickup with capstan drive and a projection device. The film runs in alternate directions, progressing from one row to the next, reversing the direction of movement and the film shifts laterally relative to the projection device and pick-up. Rapid shifting is accomplished by a spring and a quick release device to allow the shifting at the proper moment. A reversible flywheel drives the capstan and provides for a smooth reversing of the film.

---

The invention shown and described herein is an improvement on the invention of my copending application Ser. No. 257,722, filed Feb. 11, 1963.

This invention relates to a new apparatus for projecting motion picture film and particularly sound film. The invention also includes many novel mechanisms of utility in this and other motion picture projection apparatus.

The quality of sound reproduced from motion picture film is limited by the speed of film travel. Thus, for smaller film, such as 8 mm., the linear speed of film travel of conventional film, at 24 frames per second, is so relatively low that high frequency sounds cannot be adequately recorded or reproduced. Conventional picture film is also wasteful of raw film stock since each frame is accompanied by at least one strip of perforations and wasted material on each side of the perforations. Furthermore, enough film of the conventional type to provide a show of from one-half to one and one-half hours duration necessitates a pair of inconveniently large reels.

Applicant has solved the above-noted defects by printing pictures of normally 8 mm. or 16 mm. size on a wide film, such as 70 mm. in width. This film has only two edge rows of perforations and the picture frames are arranged in a multiplicity of longitudinally extending rows. The frames of each row are arranged in side by side relation, rather than one above the other as is the case with conventional film. As is known, each picture frame is a rectangle and the scene depicted thereon is wider than it is high. In conventional film the frames are placed one above the other. Therefore, any sound optically recorded on the film and related to that particular frame is allowed a linear drive of only the height of a picture frame and the speed of the film is thus so reduced that high frequency sounds cannot be adequately recorded or reproduced.

The film to be used with the present invention has picture frames arranged in longitudinal rows in side by side relation wherein the width of the scene extends along the length of the film. Thus, movement of film for each frame is connsiderably increased and a greater range of audio frequencies is possible. In addition, by arranging the rows one below the other in relatively close proximity, a longer show can be recorded on a relatively short length of film (as many as 14 rows can be placed on 70 mm. film), thus permitting the use of small reels occupying only a relatively small space and rendering it practical to distribute the film in cartridge form.

The direction of the action sequence in the upper row of frames, for instance, may extend from right to left and the action sequence of successive frames of the next lower row extend from left to right and so on. Thus, in projecting the film, it is first run in one direction to project one row of frames, then the film is stepped laterally of its width to align the next row of frames with the projector and the film is then run in the opposite direction to project the second row, and so on. Sound can also be recorded on such film in a plurality of rows along the one edge of the film strip and a separate sound reproducer sequentially scans successive rows each time the film is moved laterally. By such an arrangement, applicant is able to record shows exceeding one-half hour in length on wide film of about 2¾ inch width and on a reel or roll having an outer diameter of the order of 1½ inches. Obviously, the cost of processing a show on applicant's film is less than for conventional film since the cost of developing and printing 70 mm. is about the same as the cost of developing and printing an equal length of 8 mm. film. This invention contemplates mounting such film in cartridge form, as will be more fully decribed, and the provision of a novel projection machine adapted to have such cartridges placed thereon, in a novel manner, for projection of the pictures.

An object of the invention is to provide a novel projection apparatus, particularly adapted to receive a cartridge of the type set forth.

A further object is to provide a projection apparatus for projecting the novel film heretofore referred to either directly on an external screen or on the rear face of a built-in screen front viewing.

A still further object of the invention is to provide a device of the type described, including novel combinational features between the projection machine and removable cartridge.

An additional object is to provide projection apparatus of the type referred to wherein the film is periodically reversed and intermittently moved through a projection zone for projecting adjacent rows of frames and wherein the sound reproduction is accomplished at a portion of the film caused to move at a uniform rate irrespective of reversals of its direction of movement.

Still another and additional object is to provide a motion picture projection apparatus having many novel mechanisms and structural features.

Still further objects and advantages will become apparent to those skilled in the art as the description proceeds with reference to the accompanying drawings wherein:

FIG. 18 is a diagrammatic perspective view of the driving mechanisms incorporated in the present invention.

In nearly all figures some parts are omitted, to simplify the illustration.

Figure 1:
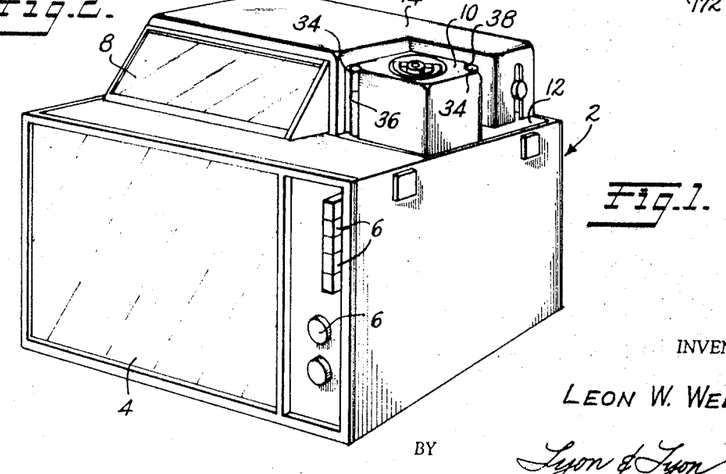
FIG. 1 is a perspective view of an apparatus embodying the present invention, viewed from the exterior of the machine.

Referring first to FIG. 1, numeral 2 generally designates a cabinet housing the present invention and wherein the front wall thereof comprises a translucent screen 4 upon the inner face of which the images are projected from the film. Numeral 6 indicates generally a group of control buttons for controlling the various operations of the machine and reference is made to applicant's copending case for a general description of these controls. A loudspeaker is housed within the housing and is indicated generally at 8 for reproducing sound recorded on the film. A removable magazine or cartridge 10, which will be described in more detail later, is shown in position on a vertically movable platform 12, which will also be described in greater detail. A removable cover 14 normally encloses the mechanism on the platform 12 and which are shown in FIG. 2, while the platform moves vertically in the manner to be described.

Figure 2:
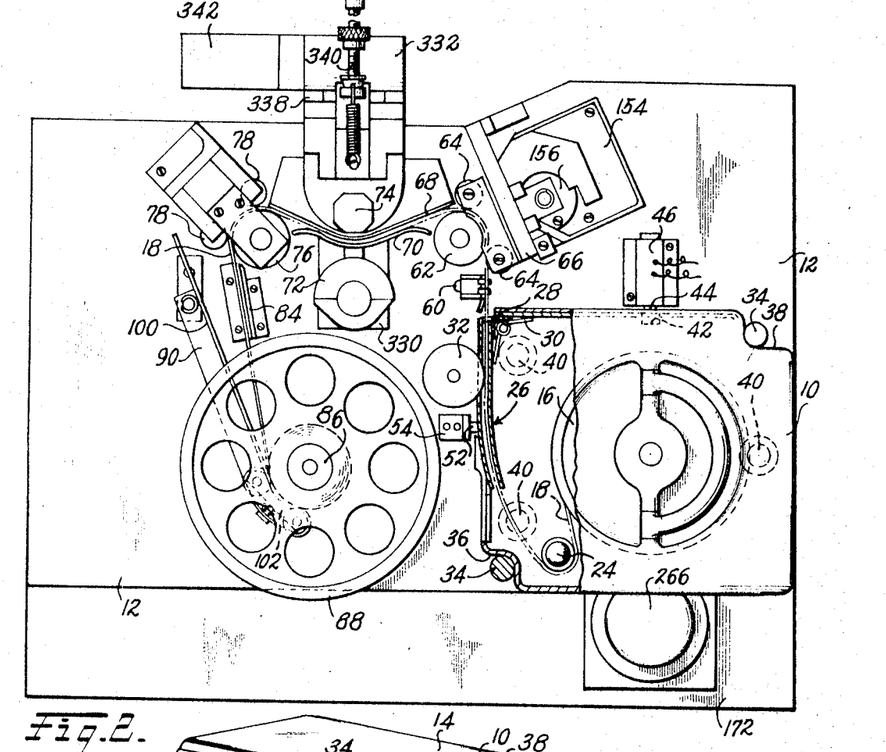
FIG. 2 is a top plan view of the film handling portions of the apparatus shown on a movable platform, with the cover plate removed.

Referring now to FIG. 2, the cartridge 10 is provided with a reel 16 therein upon which a roll of film 18 is mounted. When the cartridge 10 is placed on the apparatus, the hub of the reel 16 engages the upper end of a drive shaft 20 (see FIG. 12) and a spring urged dog 22 drivingly connects the shaft 20 to the reel 16. Also within the cartridge 10 is a guide roller 24 around which the film 18 is trained and from which it extends between inner and outer walls of a pivoted gate 26. The gate 26 is pivoted at 28 on the cartridge 10 and a spring 30 normally urges the gate to swing outwardly and to the left, as seen in FIG. 2. It is to be noted that the gate 26 is adjacent a feed roller 32, which will be further described later. The platform 12 is provided with upstanding guide pins 34 engageable in cutouts or notches 36 and 38 in opposite corners of the cartridge 10. It is to be noted that the notch 38 is deeper in on direction than is the notch 36 and, therefore, the cartridge 10 can be placed on platform 12 in only the one position of orientation wherein gate 26 is adjacent said roller 32.

Numerals 40 designate permanent magnets secured to or embedded in the bottom wall of the cartridge 10 and at least the portions of the platform 12 engaged by those magnets is of ferromagnetic material whereby the magnets serve to hold the cartridge securely in place on the platform 12, particularly when only a small amount of film is on the reel 16. One wall of the cartridge 10 is provided with a recess 42, engageable by a latch 44 actuated by a solenoid mechanism 46. As will be described, the solenoid 46 is energized at all times when power is applied to the apparatus and thus securely locks the cartridge in position on platform 12 until the film 18 has been completely withdrawn from the mechanisms, to be described, to its final position in the cartridge 10. At that time the solenoid 46 is deenergized to release latch 44 and permit removal of the cartridge.

Figures 12, 13, 14:
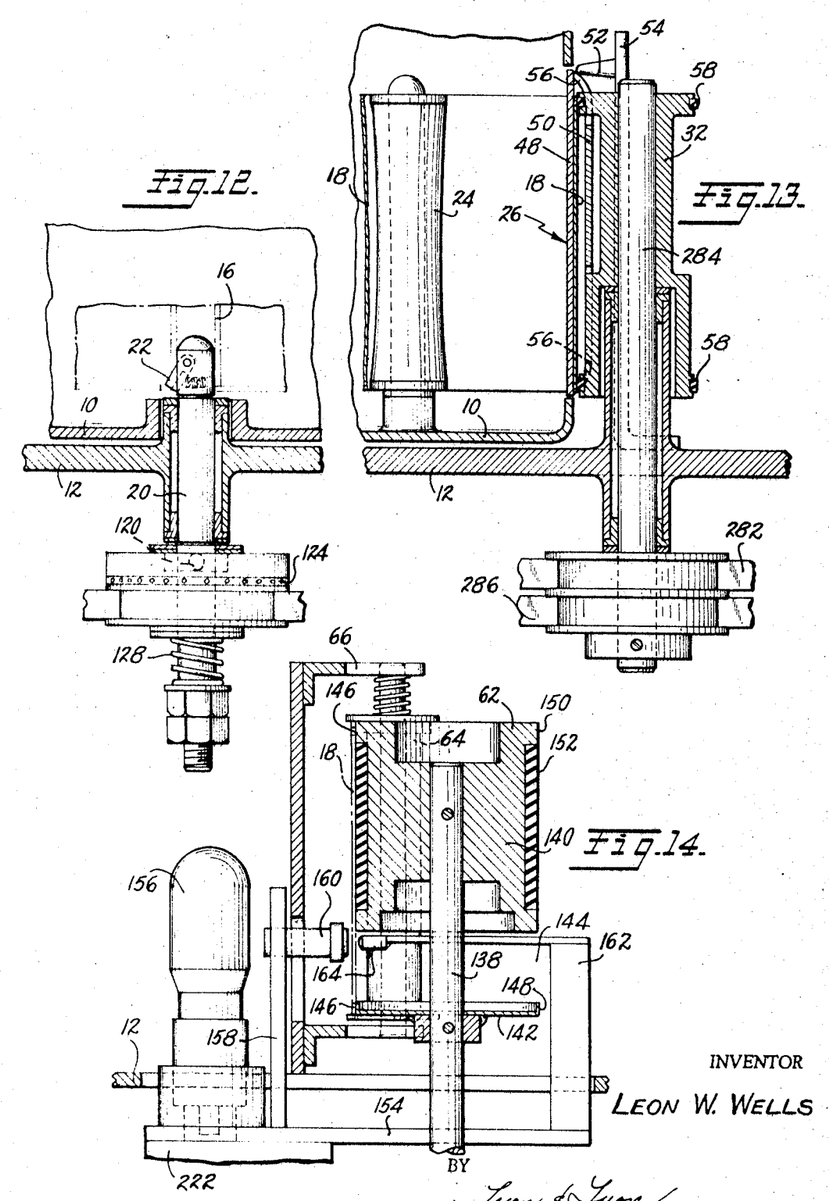
FIG. 12 is an enlarged fragmentary sectional view through a portion of the apparatus upon which the removable cartridge is placed.
FIG. 13 is an enlarged vertical sectional view through the axis of the feed roller showing its relationship to the cartridge.
FIG. 14 is an enlarged vertical sectional view through the capstan drum showing the relationship between that drum and the sound pickup means.
Figure 13:
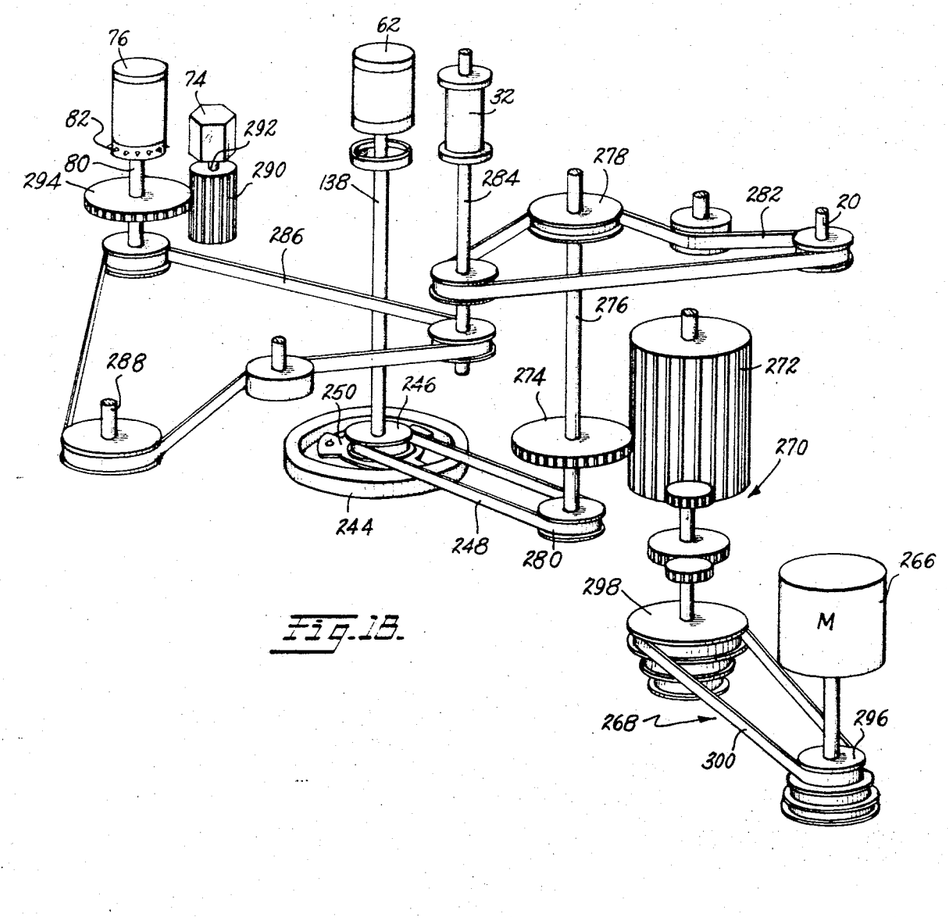

By referring now to FIG. 13, it will be seen that the gate 26 comprises an inner wall 48 and an outer wall 50, spaced apart sufficiently to permit free sliding movement of the film 18 therebetween. Normally the film slides on the inner surface of the wall 48. The outer wall 50 is curved inwardly at its upper and lower edges to define cam portions engageable by a finger 52 carried on an upright 54 fixedly secured to the platform 12 adjacent the roller 32. Portions of the outer wall 50 are cut away as at 56 to define openings through which peripheral portions of the said roller 32 extend. The upper and lower peripheral portions of said roller 32 are provided with bands 58 of rubber or the like for frictional engagement with upper and lower edge portions of the film 18. In operation, as the cartridge 10 is being placed in position on the platform 12, it is first oriented properly and aligned with the pins 34 and must necessarily be moved downwardly along those pins to its final position. The lower cam portion of the gate wall 50 first engages finger 52 to cam the gate inwardly against the action of spring 30 sufficiently for the outer wall 50 of the gate to be completely clear of the resilient rings 56 and the finger 52 holds the gate 26 in this inner position until the cartridge 10 reaches its lower position where it is seated on the platform 12, as shown in FIG. 13. As the cartridge 10 reaches this position, the finger 52 passe upwardly over the upper cam portion of the wall 50 and permits the spring 30 to swing gate 26 outwardly and press the film 18, at the openings 56, against the resilient rings 58. As will be described, the feed roller 32 is driven in rotation when the machine starts and in a direction to drive the leading end of the film 18 outwardly of the cartridge 10.

Referring again to FIG. 2, and assuming that the cartridge 10 has been placed in position in the manner described and the motor has been started for a cycle of operation, the feed roller 32 frictionally advances the leading end of the film 18 and projects it past a detecting device 60 and then toward a capstan drum 62. Adjacent the capstan drum 62 are pressure rollers 64 resiliently mounted on supporting means 66 and spring urged toward the capstan drum 62. As is apparent from the drawing, the leading end of the film will pass between the first pressure roller 64 and capstan drum 62 and then will be directed by the second roller 64 along a path between upstanding guide plates 68 and 70. The guide plates 68 and 70 are curved in a horizontal plane and direct the film 18 through a projection zone comprising a light source 72 and a rotary prism 74. The guide plates 68 and 70 are provided with appropriately aligned openings so that only a single row of picture frames is aligned therewith at one time and images are projected therefrom onto the screen 4. The manner of operation of the rotary prism 74 is well known to those skilled in the art and need not be further described. However, further reference thereto will be made later. After the leading edge of the film 18 has passed through the projection zone defined by plates 68 and 70, it is directed to the periphery of a timing sprocket 76, which likewise has pressure rollers 78 associated therewith. As shown in FIG. 18, the timing sprocket 76 is carried and driven by a shaft 80 and is provided with only a single circumferential series of sprocket teeth 82 engageable with the edge perforations of the film. It is to be remembered that the present apparatus is designed for projecting very wide strips of film, preferably about 70 mm. in width and which is provided with the sprocket openings along each of its edges. Film of this width tends to curl or curve about its longitudinal axis, thus bringing its opposite edges somewhat closer together. This tendency would render it difficult to align the openings at opposite edges with corresponding sprockets, if the timing sprocket 76 were provided with projections at both ends.

In its travel through the projection zone, the film rests on a supporting and guide surface (not shown) so that its lowermost row of perforations is held at exactly the level of the sprocket teeth 82 and thus, no problems are presented in ensuring proper engagement between those perforations and the sprocket teeth and thus renders it possible for the machine to be self-threading irrespective of any bow or curve in the film. It is further to be noted that the horizontal curvature of the guide plates 68 and 70 substantially removes any transverse bowing that may be present in the film since it is well known that film cannot be curved in two different directions at the same time. In the projection zone, it is fixed to the curvature of the guide plate 68 and held securely thereagainst throughout its width even though the film may tend to bow when not so restrained.

During the self-threading cycle of the machine, the leading edge of the film 18, as it leaves the timing sprocket 76, passes to the left of an upstanding guide plate 84 on platform 12, which directs it generally toward the hub 86 of a takeup reel 88. An arm 90 is pivoted to the platform 12 adjacent the guide plate 84 and is also provided with an upstanding guide plate 100. The leading end of the film 18 engages the upstanding plate 100 and follows the same toward the hub 86. Spring means (not shown) urge the arm 90 to swing inwardly toward the hub of reel 88 to place its pivoted roller end portion 102 against the hub 86 and thus press the leading end of the film against the hub when the latter reaches that point.

It is to be remembered that even during the self-threading portion of a cycle of operation, the cartridge reel 16, feed roller 32, capstan drum 62, timing sprocket 76, and takeup reel 88 are all being driven by means to be described, in the direction of film movement.

Figures 15, 16, 17:
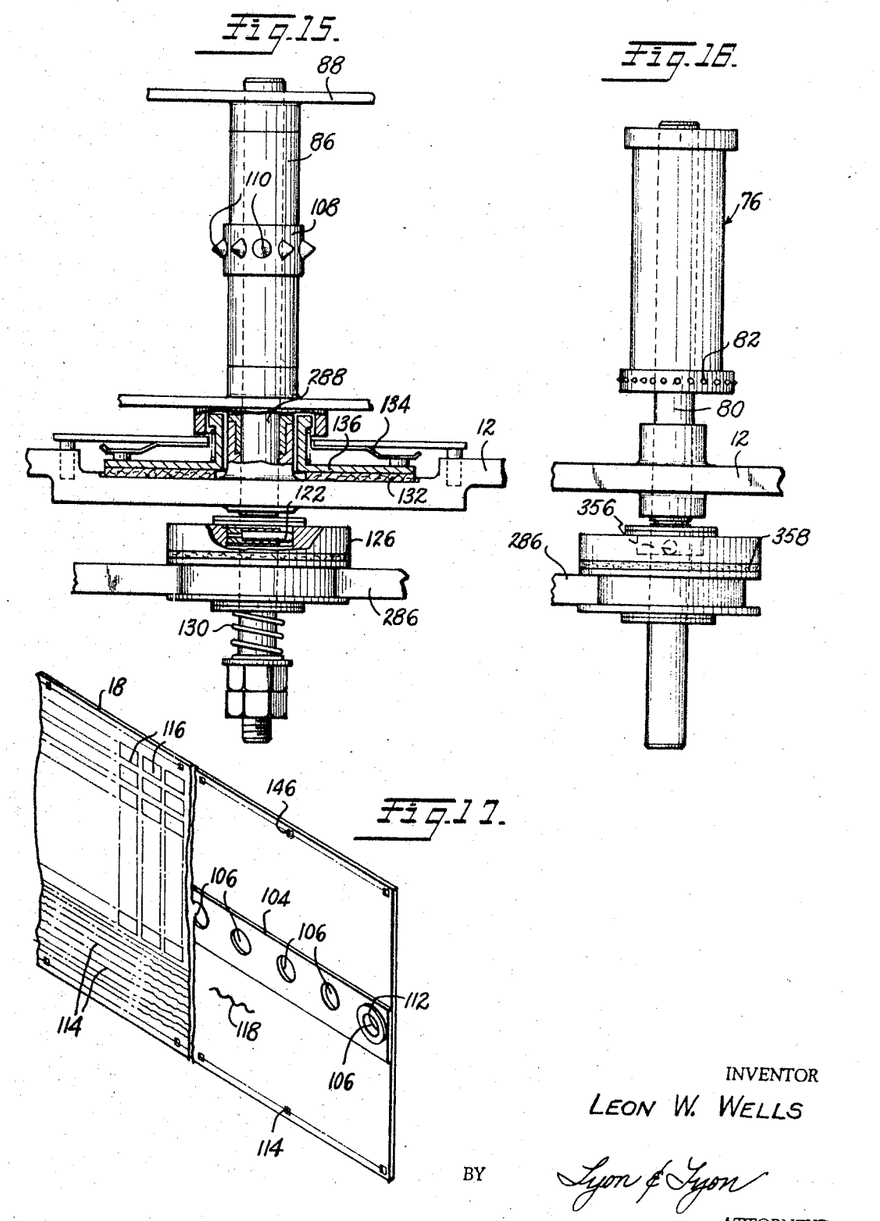
FIG. 15 is a view partly in section of the takeup reel.
FIG. 16 is a side elevational view of the timing sprocket.
FIG. 17 is a perspective view of the leading end portion of a film of the type employed with the present invention.

Referring next to FIGS. 15 and 17, FIG. 17 shows the leading end portion and leader of the film 18 and as shown therein, the leader is provided with a suitable reinforcing tape 104 extending centrally therealong. The tape 104 and film 18 are provided with a series of rather large openings 106. Referring now to FIG. 15, which shows the takeup reel 88 in fragment, it will be seen that a collar 108 is secured to the hub 86 and that collar is provided with radially directed tapered projections 110 spaced apart a distance substantially equal to the spacing between the holes 106. Thus, as the leading end of the film 18 is guided toward the hub 86, the large openings 106 will engage the outer ends of the projections 110 and no difficulties are encountered in effecting registry since the projections 110 are tapered. The projections 110 then serve as a driving means to apply tension to the film 18 to wind the same on the takeup reel. It will be appreciated that it is thus not necessary to effect accurate registry between the perforations at the edge of the film and any sprockets on the takeup reel or to effect accurate registry between any other interengaging means. The arrangement shown ensures proper engagement between the film and takeup reel and renders the self-threading feature easier to realize. An enlarged eyelet 112 surrounds the endmost opening 106 of the film 18, for a purpose to be pointed out later. The height of projections 110 is such that they are, in effect, covered by layers of film leader before any picture-bearing part of the film reaches the takeup reel.

When a cartridge has been placed on a machine in the manner described and the machine started in operation to effect threading of the film as set forth above, the drive mechanism continues to operate in the same direction to continuously move the film through the projection zone and sequentially project images from the first or upper row of picture frames. The capstan drum 62 ensures that the film move at constant speed for faithful reproduction of the sound tracks 114 (FIG. 17) as will be more fully described. When the first or upper row of picture frames 116 has been completely projected, a signal on the film, which may be either magnetic or optical, is positioned opposite the detector 60 previously referred to and causes a signal to be produced which through suitable circuitry well known to those skilled in the art is employed to step the platform 12 vertically through a distance equal to the distance between corresponding portions of adjacent rows of picture frames and to effect reversal of the drive motor to start driving the film in the opposite direction to thus project the next lower row of picture frames while the film is moving in the opposite direction. When it reaches its other end, a further signal is positioned opposite the detector 60 and the latter responds thereto to again reverse the direction of film drive and to again step the platform 12 upwardly through one step.

As shown in FIGS. 12 and 15, the reel 16 in cartridge 10 and the pickup reel 88 are power driven. The reel 16 is driven through a one-way clutch 120 and the reel 88 is driven through one-way clutch 122, so that when the film is driven in one direction onto the reel 16, that reel is being driven by the clutch 120. When the film is moving in the opposite direction, the clutch 120 cannot drive reel 16 but the clutch 122 drives takeup reel 88. Both reels, however, are driven through friction means so that some slippage between the reel and its driving clutch is possible. In each instance, the normal rate of drive is great enough to ensure reeling the film at the proper rate even when the reeled film thereon is of minimum diameter and to permit slippage of the drive when the reel approaches larger diameters so as not to alter the uniform rate of movement of film in the other parts of the mechanism. The friction means connecting the drive to the takeup reel 88 are shown in FIGS. 12 and 15 only schematically at 124 and 126, respectively. The springs 128 and 130 press the two portions of the friction drive together. The takeup reel 88 is further provided with friction brake means whereby it cannot overrun when film is being unwound therefrom. The friction brake means are indicated generally as a friction surface 132 bearing against a portion of the platform 12 and spring pressed by leaf springs 134. The friction surface 132 is carried by a disc 136, non-rotatably secured to the hub of the takeup reel 88.

Referring now to FIGS. 14 and 18, the capstan drum 62 is shown fixedly mounted on a shaft 138. As evident from FIG. 14, the capstan drum comprises two separate portions, an upper portion 140 and a lower portion 142, each separately secured to the shaft 138. It is to be understood, however, that both portions could be formed integrally. The portions 140 and 142 are axially spaced apart to define a circumferential groove or space 144, having a purpose to be described later. The film 18 is provided with rows of perforations 146 (see FIG. 17), along its opposite edges. It is essential that the drum 62 exercise complete control over the speed of movement of the film 18 and for this reason it is desirable that the drum be provided with a good friction surface, preferably rubber or the like. However, if the rubber surface were to extend from end to end of the drum, it would necessarily underlie the rows of perforations and during use of the apparatus, the perforations would tend to cut out and roughen the rubber surface. For this reason the lower portion 142 of the drum is of metal to present a metallic peripheral surface 148 to the lower row of perforations and the upper portion 140 is provided with an upper peripheral surface 150, also of metal, and which underlies the upper row of perforations. An intermediate portion of the portion 140 has a peripheral sleeve of rubber or the like 152 recessed therein and flush with the peripheral surfaces 148 and 150. The rubber-like material 152 frictionally engages the film 18 to drive and control the speed of the latter. It is to be noted that the resilient material 152 axially spans the rows of picture frames 116 and thus presents a soft surface to that portion of the film to prevent scratching or marring of the images recorded in the frames.

As already referred to with reference to FIG. 17, a lower portion of the film 18 is provided with parallel sound tracks 114. The groove or space 144 of the capstan drum is opposite the sound tracks, thus rendering both faces of the film accessible in that region. As shown, the sound tracks are optical and, therefore, an optical sound detecting system is illustrated. However, it is to be understood that magnetic recordings of sounds could also be used. The sound detecting system comprises a second platform 154 upon which a suitable light source 156 is mounted. The platform also carries a support 158 and a focusing optical system 160 to focus light from the source 156 onto a single sound track 114. The optical system 160 projects inwardly close to the outer surface of the film 18, outwardly of the groove 144. The second platform 154 also supports a post 162 upon which a photoelectric detecting member 164 is mounted. It is to be remembered that the film 18 does not extend completely around the drum 62 (see FIG. 2) and thus, there is room for the photoelectric device 164 to project inwardly from support 162, past the shaft 138 and into proximity with the inner surface of film 18 in direct alignment with the axis of the optical system 160. The shaft 138 is journalled in fixed relation to and moves up and down with the platform 12. However, the second platform 154 carrying the sound pickup system is vertically movable separately from the platform 12, as will be described in more detail later.

Figure 3:
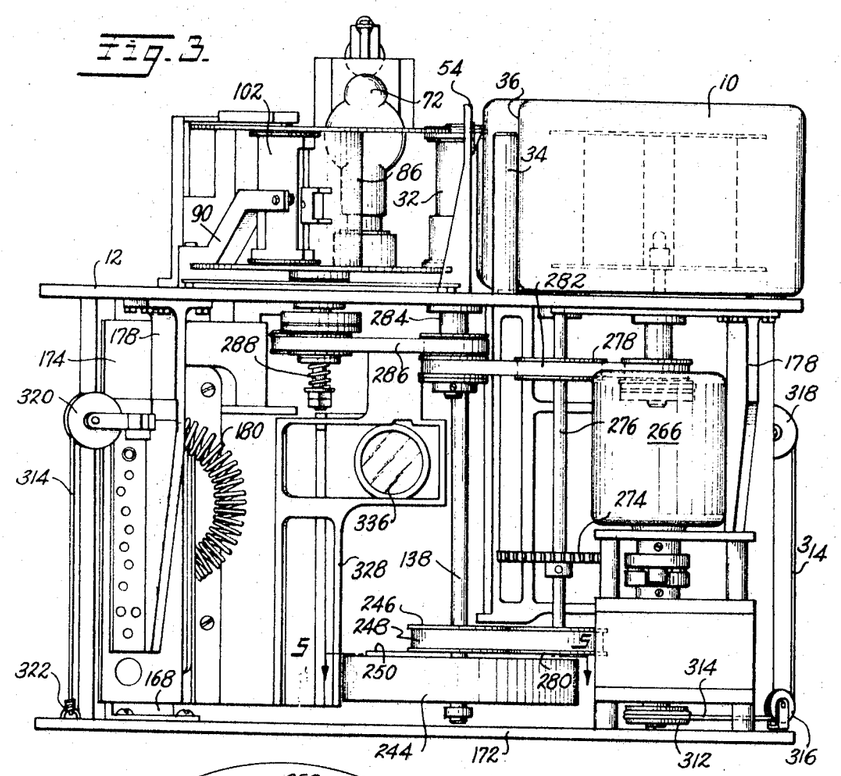
FIG. 3 is a front elevational view of the mechanisms shown in FIG. 2 and other portions of the apparatus.
Figures 7, 8, 9, 10, 11:
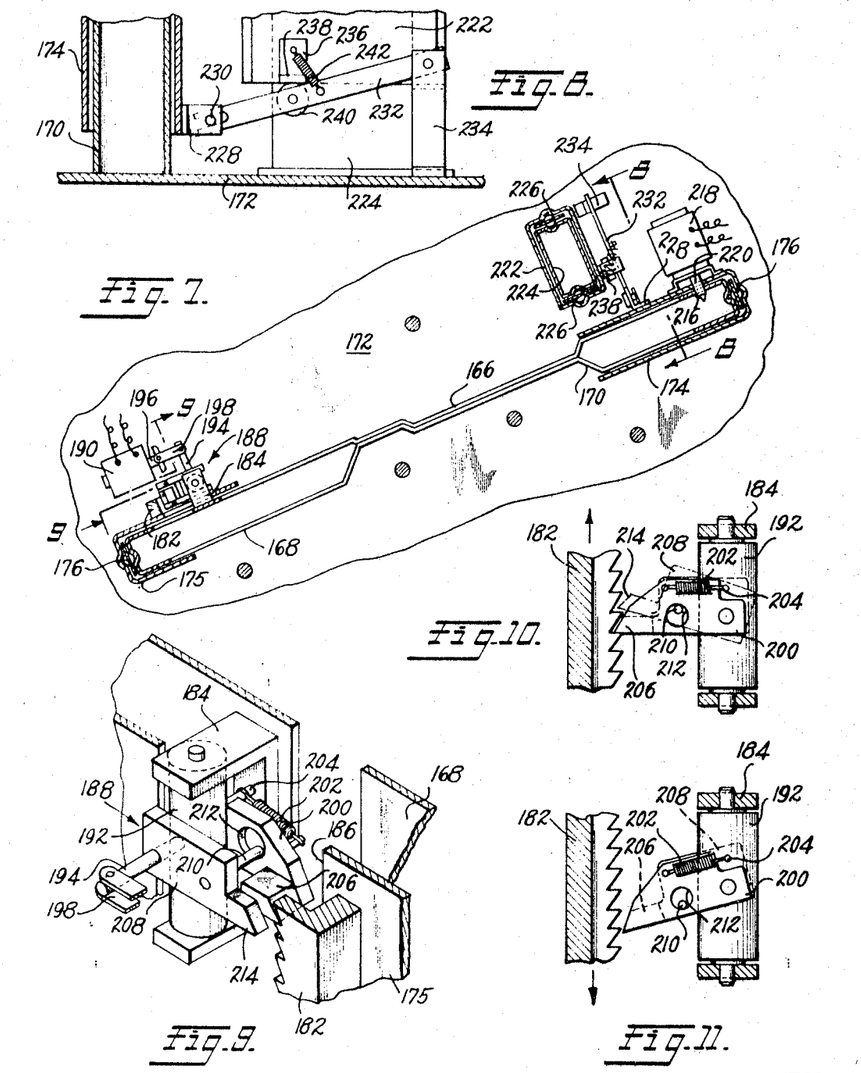
FIG. 7 is a horizontal sectional view through a portion of the apparatus of FIG. 3.
FIG. 8 is an enlarged sectional view taken along the line 8—8 of FIG. 7.
FIG. 9 is an enlarged perspective view of that portion of the apparatus of FIG. 7 shown to the right of the line 9—9.
FIGS. 10 and 11 are diagrammatic views illustrating the operation of the mechanism of FIG. 9.

Referring now to FIGS. 3, 4 and 7–11, reference will be made to vertically movable platform 12 and the means for mounting and moving same. Extending laterally adjacent the undersurface of platform 12 is a transverse structure 166 which is formed at its lateral extremities into vertically extending legs 168 and 170. The machine also includes a base 172 to which the upstanding legs 168 and 170 are secured. The guides 174 and 175 are of the shape generally shown in FIG. 7 and embrace the legs 168 and 170 fixed to the base for guidance thereby. As shown in FIG. 7, the guides 174 and 175 constitute depending legs fixed on the platform 12 and are linearly guided by legs 168 and 170 by means of suitable linear ball bearing devices 176 of known and conventional construction. To ensure rigidity, bracing or gusset plates 178 interconnect the platform 12 and depending guide legs 174 and 175. A plurality of relatively stiff springs 180, only one spring being shown in FIG. 3, are arranged with one end thereof fixed to the legs 174 and/or 175 and the other ends thereof secured to the guide posts 168 and 170. The springs are initially curved or flexed as shown in FIG. 3, so that their inherent resiliency tends to lift the platform 12 relative to the base 172. It will be apparent that the upper ends of springs 180 are secured to the legs 174 and/or 175 while their lower ends are secured in any suitable manner to the posts 168 and 170 fixed to the base 172. Thus, the springs 180 constantly urge the platform 12 in an upward direction. However, a ratchet bar 182 (see FIGS. 7 and 9) is fixed to the leg 175 and the corresponding post 168, fixed to the platform 12, is provided with a bracket 184 projecting through an elongated opening 186 in the corresponding leg 175. As shown, the ratchet bar 182 is provided with upwardly facing teeth, the upper faces of which are spaced apart a distance corresponding to the spacing between the rows of picture frames on the film. The bracket 184 carries an escapement mechanism indicated generally at 188 and operable by a solenoid 190 in the manner now to be described. The escapement mechanism 188 comprises a post 192 rotatably mounted in bracket 184 and having a laterally extending arm 194. The armature 196 of the solenoid 190 is spring urged outwardly and is connected to the arm 194 by means of a suitable linkage 198. Thus, when the solenoid 190 is energized, the post 192 is swung in a counterclockwise direction, as viewed in FIGS. 7 and 9. A pawl 200 is pivotally mounted on one side of the post 192 and is urged by spring 202 to swing in an upward direction to abut a shoulder thereon against a pin 204 carried by the post 192. A laterally extending nose piece 206 on the pawl 200 is normally in a position to engage one of the teeth of the ratchet bar 182 and since the pawl cannot swing upwardly from the position shown in FIG. 9, it functions to hold the ratchet bar 182 and, therefore, platform 12 in a fixed position of elevation even though the springs 180 are urging the platform upwardly. A second pawl 208 is pivotally mounted on the arm 194 and is provided with a laterally extending pin 210 projecting into an enlarged opening 212 in the pawl 200. The pawl 208 is formed to define a nose piece 214 which is at the same level and in accurate alignment with the nose piece 206 when the pin 210 is at the bottom of the opening 212.

When the solenoid 190 is energized, it pivots the post 192 in a direction to withdraw nose piece 206 from the notch of ratchet bar 182 and to project the nose piece 214 into the same notch. Since the pawl 208 is free to swing upwardly a limited amount, the springs 180 are then effective to lift the platform 12 and thus pivot the pawl 208 upwardly to the position shown in dotted line in FIG. 10. The opening 212 and the pin 210 are so dimensioned that at the upward limit of movement shown in FIG. 10 the nose piece 206 is positioned in lateral alignment with the next lower notch in the ratchet bar 182. Thus, when the solenoid is then deenergized, its armature 196 is spring urged to the position of FIG. 7 to project the nose piece 206 into the notch with which it is aligned. At that time the nose piece 214 of pawl 208 is withdrawn from the upper notch and falls to the position of FIG. 9, ready for the next step of platform advancement. Thus, the platform has been moved upwardly one tooth of the ratchet bar 182 and has positioned the next lower row of picture frames in position to be projected. As will be described later, after projection of the last or bottom row of picture frames, the platform 12 is pulled downwardly to its lowermost position to prepare the machine for another roll of film. The spring 202 and stop pin 204 permit both pawls 200 and 208 to swing downwardly, as shown in FIG. 11, so that the platform and ratchet bar 182 may be rapidly lowered without having to actuate the escapement mechanism 188 in a step by step manner.

The ratchet bar 182 and its associated escapement mechanism are mounted adjacent the depending legs 175 of the platform 12. However, due to the fact that enough clearance must be provided between the legs and their guide posts to permit the platform 12 to be guided and to move vertically, some small amount of play is necessarily present between the upstanding guide posts 168 and 170 and the legs 174 and 175 of the platform. Even a small amount of play could so misalign the picture frames being projected as to be unacceptable. To ensure that each successive row of picture frames is held in exactly the right elevation at each step, an indexing arrangement is provided adjacent the depending leg 174. As shown in FIG. 7, the post 170 is provided with a vertical series of openings 216 (only one being shown) spaced apart vertically a distance exactly equal to the distance between the faces of the teeth of ratchet bar 182. The solenoid 218 is mounted on leg 174 and is provided with an armature 220 projected through an opening in the leg 174 and into an opening 216 in post 170 to thus lock the leg 174 against any vertical movement and to ensure that it be held at exactly the right elevation. When the solenoid 218 is energized, the armature 220 is withdrawn from opening 216 thus permitting the platform to rise one step, after which the solenoid 218 is again deenergized and armature 220 is again projected outwardly into the next lower hole 216 in post 170.

As has been previously stated, the sound tracks 114 all extend along one edge portion of the film 18 and since the individual sound tracks are much narrower than successive rows 116 of picture frames, the same number of sound tracks as there are rows of picture frames, is provided on the film. However, the sound tracks may be much closer together and occupy a narrower portion of the film than do the picture frames. Thus, when the platform 12 moves upwardly a distance equal to the distance from one row of picture frames to the next, it is necessary that the sound pickup system described with reference to FIG. 14, also be moved upwardly but through a lesser distance so that it would then be properly aligned with the next sound track. For this purpose, the second platform 154 is mounted on a vertical slide 222 (see FIGS. 7 and 8) guided on a further upstanding post 224 fixed to the base 172. Linear ball bearing devices 226 provide anti-friction guiding means between elements 222 and 224. As shown, the depending leg 174 is provided with a bracket 228 thereon and which is provided with a pin 230 engaging in the bifurcated end of a lever 232, the other end of which is pivoted on a post 234 secured to the base 172. The slide 222 has a bracket 236 fixed thereto and having a flange portion 238 bearing against a roller 240 journalled on the lever 232. A spring 242 holds the roller 240 against the flange 238 at all times. From the structure thus shown and described, it is obvious that upward movement of the leg 174 will cause the lever 232 to swing upwardly and the roller 240 thereon will lift slide 222 a proportional amount. However, the slide 222 will move upwardly a lesser distance than the platform 12 and the position of roller 240 on lever 232 is so selected as to provide exactly the right amount of movement to slide 222 so that the sound detecting system will be properly aligned with the next sound track after each step of upward movement of the platform 12.

Figure 5:
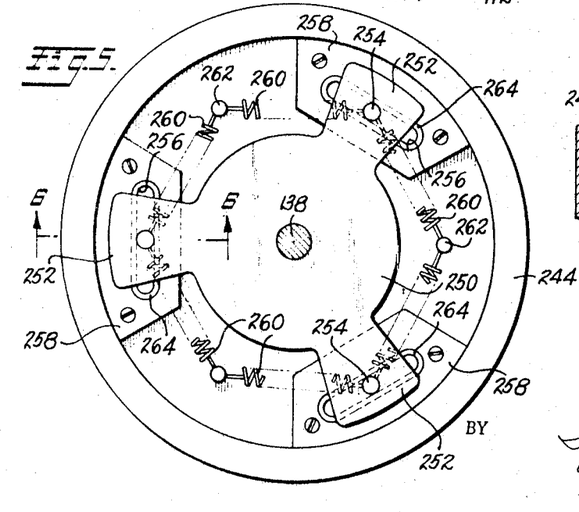
FIG. 5 is a horizontal sectional view, on an enlarged scale, taken along the line 5—5 of FIG. 3.
Figure 6:
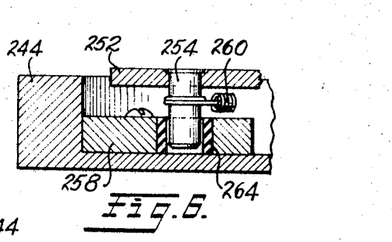
FIG. 6 is a further enlarged sectional view taken along the line 6—6 of FIG. 5.

The capstan drum 62 controls the speed of movement of the film 18 and it is important that the capstan be driven at a uniform speed in each direction and that reversal thereof be accomplished rapidly and smoothly at the end of each row of picture frames. As shown in FIGS. 3, 5 and 6, the shaft 138 on which the capstan drum is mounted also has a flywheel 244 fixed thereon, adjacent the lower end of the shaft. This flywheel thus ensures rotation at a uniform speed unaffected by slight variations in load or speed of the driving motor. Freely journalled on the shaft 138, above flywheel 244, is a driving pulley 246 driven by a belt 248. Fixed to the pulley 246 is a spider 250 (FIG. 5) having radial ears 252 from which driving pins 254 depend. There is one driving pin in each ear and it projects downwardly into a corresponding straight tangential slot 256 in the flywheel 244. Actually, as shown, the slot 256 is provided in a separate member 258 secured to the flywheel. Extending from each pin 252 is a pair of tension springs 260. The springs extend in opposite directions from each pin 254 and are fixed at their other ends to suitable anchor pins 262 fixed to the flywheel. Thus, the springs 260 constitute a driving connection between the pulley 246 and the flywheel 244. During continuous rotation in one direction, the springs 260 will cause pin 254 to assume a centralized position in the slot 256 and remain there, the drive being effected through the springs. The slots 256 are straight and extend tangentially of the pins 254. At least the opposed straight edges of the slots are lined with a layer of resilient material 264, which may be rubber or the like. When the pins 254 are in the centralized positions shown, they are free of contact, that is spaced slightly from, the elastic material 264. When the driving motor is reversed, however, the pins will move toward one end or the other of the slots 256 and in doing so, will tension one or the other of the springs 260 to apply a reverse torque to the flywheel 244. As the pins move in the slots 256, they increasingly engage and compress resilient material 264, which thus serves as a shock absorber media to prevent undue relative rotation between the pulley 246 and the flywheel 244 and thus effect a smooth reversal of drive of the capstan drum. After the direction of rotation of the flywheel has thus been reversed, the springs 260 will again equalize their forces and return the pins 254 to the central position of the slots 256.

Referring now to FIG. 18 which shows, in a schematic manner, the driving arrangement for the machine of the present invention, the various drive belts, shafts and pulleys will be described.

Carried by the base 172 is a motor drive assembly comprising an electric motor 266, a change-speed pulley arrangement 268 and reduction gearing 270. The reduction gearing includes an elongated gear 272, preferably of nylon or the like, journalled on a vertical axis on the base 172. Meshing with the gear 272 is a narrow spur gear 274 fixed on a drive shaft 276 which has pulleys 278 and 280 fixed thereon. The shaft 276 is journalled on the platform 12. The upper pulley 278 drives through a belt 282 to a pulley fixed on the cartridge reel shaft 20 and to a pulley fixed on the feed roller shaft 284. A second pulley on the feed roller shaft 284 drives a belt 286, which is trained about a drive pulley on timing sprocket shaft 80 and another pulley on the takeup reel shaft 288. The lower pulley 280 on the shaft 276 drives the belt 248 which extends to the pulley 246 for driving the flywheel 244, as already described. The various shafts thus far described as being driven by gear 274 are all journalled on the platform 12 and thus move vertically therewith. The elongated gear 272 permits this vertical movement while maintaining a driving relationship between the motor and those shafts. The prism 74 at the projection station, however, is not vertically movable but is journalled about an axis fixed relative to the base 172. It is, however, necessary to maintain a positive phase relationship between the prism 74 and the timing sprocket 76. To accomplish this, an elongated gear 290 is fixed to the shaft 292 which carries the prism 74. A flat spur gear 294 mounted on the timing sprocket shaft 80 is in mesh with the elongated gear 290 so that the timing sprocket may move vertically with the film and platform 12 and yet maintain a proper driving relation to the prism 74 which does not move vertically.

Figure 4:
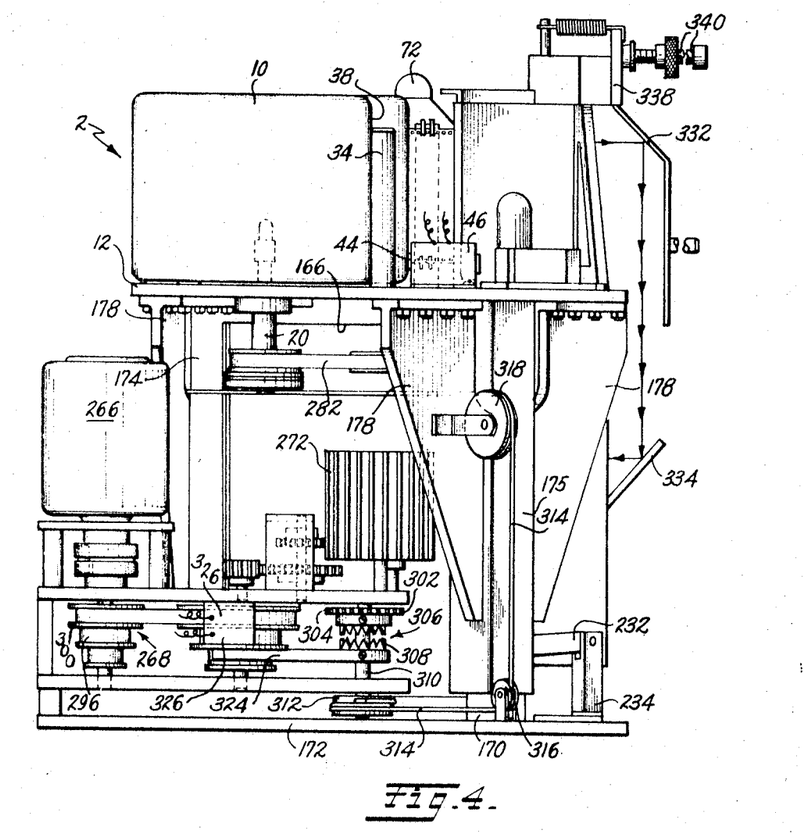
FIG. 4 is a side view of the mechanism of FIG. 3 showing the driving means.

FIG. 4 shows the drive motor arrangement in somewhat more detail and schematically illustrates the mounting for the motor, the change-speed mechanism 268 and the reduction gearing 270. It will be seen that the speed changing arrangement 268 comprises stepped pulleys 296 and 298 (FIG. 18) and a belt 300. The purpose for providing this change-speed arrangement is to permit the machine to be used for projecting film having picture frames of different dimensions. To obtain the correct number of frames per minute in the projection zone, it is necessary that the film and related mechanisms be driven at a lower linear speed for smaller picture frames and at higher linear speed for larger picture frames. Also shown in FIG. 4 is a further gear 302 fixed to the lower end of the shaft carrying the elongated gear 272 and which drives a second gear 304 constituting the input member of a clutch 306. The output member 308 of the clutch is fixed against rotation relative to the shaft 310 but is slidable therealong. The gear 304 is freely rotatable on the shaft 310. When the clutch elements of clutch 304 are engaged, the shaft 310 is driven in rotation and rotates a drum 312 fixed to the lower end thereof. A cable 314 has one end fixed to the drum 312 and extends therefrom about an idler pulley 316 journalled on the base 172, then upwardly over a first pulley 318 mounted on one of the gusset plates 178 fixed to platform 12, then laterally to a second pulley 320 (see FIG. 3) on another gusset plate, and downwardly to a point where it is anchored to the base 172 at 322. Thus, when the shaft 310 is rotated in one direction, it will pull on cable 312 and forcibly pull the platform 12 downwardly to its lowermost or starting position.

A suitable actuating arm 324 is connected to the output member 308 of clutch 306 and is controlled by a solenoid 326. When the solenoid is energized, the clutch is engaged and when the solenoid is deenergized, the clutch 306 becomes disengaged.

The projection system previously referred to and comprising the light source 72 and prism 74 is fixedly mounted on a skeletal framework 328 (ee FIG. 3), carried by the base 172 and supporting a fixed platform 330 (see FIG. 2), upon which the light source 72 is mounted and upon which the prism 74 is journalled. Although not shown in the figures, it is to be understood that an optical lens system is mounted on the platform 330 in a position to receive images passing through the prism 74 from the film 18. That first lens system directs an image of the picture onto a mirror 332, as shown in FIG. 4, from where the image is reflected downwardly to a further mirror 334 and thence forwardly into a second lens system 336, shown only in FIG. 3. The parts of the apparatus are so positioned that there is open space from the lens system 336 to the rear face of the translucent screen 4 and the pictures are thus projected onto the rear of that screen. The continuously moving film and rotating prism type of projection system is well known to those skilled in the art and need not be further described. The mirror 332 is carried by a bracket structure 338, rotatable about a horizontal axis coinciding generally with the axis of the screw 340 shown in FIGS. 2 and 4. Thus, the bracket may be swung about that axis to move mirror 332 laterally away from the optical axis of the first lens system referred to and with the mirror 332 thus removed, the first lens system may be employed to project the images directly onto an external screen. If desired, a second mirror 342 (FIG. 2) may be mounted on the bracket 338 to be interposed across the optical axis of the first lens system when mirror 332 is swung laterally and thus reflect the image to one side of the machine for direct projection to an external screen. The mirror 342 is preferably in the same plane as the mirror 332 but is laterally spaced therefrom, as shown in FIG. 2.

Earlier in the description reference was made to the enlarged eyelet 112 (FIG. 17) at the leading end of the film 18. That eyelet is of sufficient thickness so that it will not pass between the inner and outer walls 48 and 50 of the pivoted gate 26 on cartridge 10. Thus, when the film is being rewound in the cartridge, the eyelet 112 ensures that the end of the film be retained in the gate 26 for later engagement by the driving roller 32.

When it is desired to project a reel of film, a cartridge containing the film is placed on the platform 12 in the manner already described. At that time the platform 12 is in its lowermost position so that the upper row of picture frames will be at the proper level, when passing through the projection zone to be projected in the manner described. After the cartridge is a place, a starting button is actuated (not shown) which turns the power on the machine. The drive mechanism begins operation and the film is withdrawn from the cartridge and threaded through the apparatus in the manner already described and as soon as the first frame of the top row reaches the projection zone, projection commences and continues until the first row has passed through the projection zone. It is to be remembered also that upon depressing the starting button, the solenoid 46 is actuated to positively lock the cartridge 10 to the platform 12. When the last frame of the first row of frames reaches the projection zone, a suitable signal recorded on the film reaches a position directly opposite the detector 60. That signal may be a signal of predetermined frequency, for example 40 or 60 c.p.s., which would not be normally detected by the sound detecting system but which produces a response in the detector 60 to effect deenergization of the indexing solenoid 218, to effect energization of the escapement solenoid 190 and to also effect reversal of the direction of rotation of drive motor 266. Thus, at the end of one row of picture frames, the platform is automatically stepped up one step and then locked in that position and the direction of film drive is reversed and continues in the reverse direction until the second row of picture frames has been projected. At the end of the second row of picture frames, the cycle is repeated. It is to be noted, however, that at this time the signal to which detecting means 60 is responsive will probably coincide with at least one of the sound tracks 114. However, the sound pickup system does not respond to the low frequency signal employed and the only response thereto is produced in the detector 60. It is contemplated that only even numbers of rows of picture frames 116 will be printed on any film. Thus, the last or bottom row is projected while the film is being moved in a direction toward the cartridge 10. A switch, not shown, is provided to be responsive to the platform 12 reaching its uppermost position, that is when the last row of picture frames is being projected. That switch controls the output of detector 60 so that at the end of the last row of picture frames, the detector 60 causes retraction of the indexing pin 220 but does not affect reversal of the motor 266 or actuation of the escapement mechanism. It does, however, energize the solenoid 326 so that continued rotation of the motor pulls the platform 12 downwardly to its lowermost position to prepare the apparatus for the next reel of film and to continue winding the film on the cartridge reel. When the terminal end of the film approaches the cartridge gate, the signal 118 (FIG. 17) near the end of the film actuates the detector 60 to shut off the motor 266 and solenoid 326 and at the same time this releases the latch 44 and the machine stops. Even though the inertia of the parts may cause the cartridge reel to overrun slightly after power has been cut off, the eyelet 112 will stop the film in the proper relation to the gate 26, as described.

Figure 19:
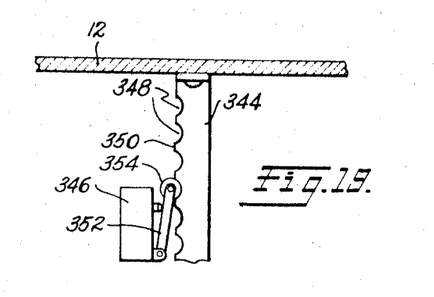
FIG. 19 is a diagrammatic view of a preferred form of motor reversing means.

In the above description, it was assumed that the detecting means 60 directly effected reversal of the motor 266. While this is a possible mode of operation, it is contemplated that the motor be reversed through a further control switch shown in FIG. 19. As shown in FIG. 19, a depending bar 344 is fixed to and depends downwardly from the platform 12 adjacent a switch 346 mounted in fixed relation to the base 172. The bar 344 is provided with a series of notches or depressions 348 spaced apart a distance equal to the spacing between *two* rows of picture frames. Thus, the distance between the center of one notch 348 and the center of an adjacent crest portion 350 is equal to the distance between adjacent rows of picture frames. The switch 346 is provided with an actuating lever 352 for controlling the direction of rotation of the drive motor. When the arm is swung inwardly, the motor is caused to rotate in one direction and when swung outwardly, to the position of FIG. 19, the motor is caused to rotate in the other direction. As will be apparent, when the follower roller 354 on the ends of arm 352 is in one of the notches 348, the motor continues to rotate in one direction as long as that relationship is maintained. However, when the platform 12 moves upwardly a distance equal to the space between adjacent rows of picture frames, the bar 344 will move upwardly to a position where the roller 354 engages and rests against one of the crests 350 and thus the arm 352 is maintained in its innermost position to effect reverse drive of the motor. At the next succeeding step the roller 354 drops into the next notch 348 and the motor is again reversed, and so on.

From the foregoing description it will be understood that the capstan drum 62 is driven at a uniform speed, which is carefully calculated and controlled to effect the correct speed of projection of successive picture frames. Movement of the film under control of the capstan drum will regulate the rate of rotation of timing sprocket 82 and since there is no slippage between that sprocket and the film, a constant and correct relationship between the picture frames on the film and the prism 74 is maintained at all times even though the belts 282 and 286 tend to drive their respective shafts at a somewhat higher speed, preferably about 20% higher. The tendency to overdrive is particularly important when considering the magazine reel and the takeup reel. They must maintain adequate tension on the film at all times irrespective of the diameter of the film rolled thereon. The various friction clutches and brakes described permit variation of the speed of the particular reel, then acting as a takeup reel.

The drive to timing sprocket 76 is also through a one-way clutch 356 (FIG. 16) and a friction clutch 358. The one-way clutch 356 drives shaft 80 only when film is moving toward takeup reel 88.

While a single specific embodiment of the invention has been shown and described herein, it is to be understood that the same is merely illustrative of the inventive concept and that other embodiments may be resorted to within the scope of the appended claims.

I claim:

1. In a motion picture projector for projecting sequential images from a motion picture film having a plurality of parallel rows of picture frames extending longitudinally thereof with at least two such rows comprising a single story sequence progressing in from row to row on the film; means defining a stationary projection zone; a movable support adjacent said projection zone and having film supporting and feeding means for moving film longitudinally through said projection zone, said support being movable in opposite directions transverse to the length of said film in said zone; means constantly urging said support with substantial force to move in one of said transverse directions; and release means normally holding said support against movement and being responsive to predetermined longitudinal positions of said film for rapidly releasing said support for instantaneous movement of the film and support in said one transverse direction through a distance equal to the spacing of said rows of picture frames for continuous and uninterrupted projection of a single story sequence from row to row.

2. A motion picture projector as defined in claim 1 wherein said release means comprises a fixed guide member and a movable member fixed to said support and guided by said guide member; a ratchet bar fixed to one of said members and an escapement device, cooperable with said ratchet bar, fixed to the other member.

3. A motion picture projector as defined in claim 2 including another fixed guide member and another movable member guided thereby and fixed to said support; and cyclically operable indexing means for holding said other guide member and other movable member in predetermined fixed relation at each step of movement of said support.

4. A motion picture projector as defined in claim 1 wherein said release means includes signal detecting means adjacent the path of longitudinal movement of said film on said support and responsive to signals adjacent the ends of said rows for actuating the releasing of said support.

5. A motion picture projector as defined in claim 4 including drive means for feeding said film over said support; said detecting means being responsive to a different signal adjacent the trailing end of the last row of picture frames for drivingly connecting said drive means to said support for moving said support in a direction opposite said one transverse direction to thereby return said support to its starting position.

6. In a motion picture projector for projecting sequential images from a motion picture film having a row of perforations along each edge portion and a plurality of rows of picture frames and a plurality of sound tracks both extending longitudinally thereon between said rows of perforations: a support; means for guiding and advancing said film on said support; said advancing means comprising a rotatable capstan drum on said support and having circumferential end portions of hard rigid material frictionally engageable with the edge portions of said film containing said rows of perforations; at least the surface of an intermediate portion of said drum comprising relatively soft resilient material for frictionally engaging a face of that portion of said film containing said rows of picture frames; and a second intermediate portion of said drum of a reduced diameter forming a channel opposite the portion of said film containing said plural sound tracks.

7. A motion picture projector as defined in claim 6 wherein said plurality of parallel longitudinal sound tracks is adjacent one edge of said film; said drum having the said channel adjacent one end thereof of a width and positioned to span all of said sound tracks when said film frictionally engages said drum; and nonrotatable sound detecting means having a first portion extending in said channel to a position adjacent the inner face of a film overlying said channel and having an opposed portion extending to a position adjacent the outer surface of said film.

8. A projector as defined in claim 7 including projection means along the path of movement of said film on said support for projecting images from a row of frames thereof; first means for relatively moving said support and projection means in a direction transverse to said rows to project images from frames of a different row; and second means relatively moving said drum and said sound detecting means in a direction axially of said drum for detecting sound from a different sound track.

9. A projector as defined in claim 8 wherein said first and second means are interconnected whereby to position said sound detecting means opposite the sound track corresponding to that row of picture frames being projected.

10. A projector as defined in claim 9 wherein said sound tracks are spaced apart a distance less than the distance between corresponding parts of each of said rows; said second means being arranged to relatively move said drum and sound detecting means a distance less than the relative movement between said projection means and said support.

11. A projector as defined in claim 8 including drive means for rotating said drum; and means for reversing the direction of rotation thereof upon actuation of said first means whereby successive rows of frames are projected with said film moving in respectively opposite directions.

12. In a motion picture projector for projecting images from a motion picture film having a plurality of rows of picture frames extending longitudinally thereon and wherein successive rows of frames are projected with said film moving in respectively opposite directions: a rotatable capstan drum for frictionally driving said film in either direction; a flywheel fixedly secured to said drum for rotation therewith; reversible drive means; and resilient lost motion means drivingly connecting said drive means to said flywheel.

13. A projector as defined in claim 12 wherein said drive means includes a rotatable member coaxial with said flywheel; said resilient lost motion means comprising tension springs secured at one end to said member and extending generally tangentially in opposite directions therefrom, the other ends of said tension springs being secured to said flywheel.

14. A projector as defined in claim 13 wherein said resilient lost motion means further includes tangential straight slots in a side of said flywheel; the inner and outer straight sides of said slots having a layer of elastomeric material thereon; axially extending pins fixed on said rotatable member and extending loosely into said slots between said layers of elastomeric material.

15. A projector as defined in claim 14 wherein said springs normally hold said pins intermediate the ends of said slots and spaced from said layers of elastomeric material; said material engaging said pins and serving as shock absorbing means only upon relative rotation between said flywheel and drive means when the direction of rotation of said drive means is reversed.

16. In a motion picture projector for projecting sequential images from a motion picture film having a plurality of rows of picture frames extending longitudinally thereon; a base having a motor and picture projection means mounted thereon; a vertically elongated output gear journalled on said base on a vertical axis; driving means connecting said motor to said output gear; a platform movable vertically on said base; rotatable film guiding and transport means journalled on said platform to move the film past the picture projection means; said vertical platform movement causing successive rows of picture frames to move into alignment with said picture projection means; transmission means for driving said film guiding and transport means and including an input gear journalled on said platform; said input gear meshing with said output gear and being slidable therealong as said platform moves vertically of said base for producing a continuous drive to said film guiding and transport means.

17. A projector as defined in claim 16 wherein said driving means comprises a speed changing mechanism.

18. A projector as defined in claim 16 including means for moving said platform upwardly from said base in sequential steps for projecting successive rows of picture frames; a winch device on said base and having cable means thereon connected to said platform; and clutch means for drivingly connecting said motor to said winch device whereby said motor pulls said platform downwardly to a starting position when said clutch is engaged.

19. A projector as defined in claim 16 including a rotatable projection device journalled on said base on a vertical axis and having a second vertically elongated gear thereon; said transmission means including a timing gear journalled on said platform, drivingly meshing with said second vertically elongated gear and being slidable vertically therealong.

20. In the motion picture projector of claim 1 wherein said film supporting and driving means includes a reversible drive means for moving said film longitudinally along a predetermined path past said stationary projection zone to project one of said rows of frames from end to end thereof; a sound detector adjacent said path and responsive to sound signals of predetermined frequency on said film for effecting the lateral release movement of said film relative to said projection zone to present an adjacent row of picture frames to said device and for effecting substantially simultaneous reversal of said drive means.

References Cited

UNITED STATES PATENTS

| | | | |
|---|---|---|---|
| 1,858,555 | 5/1932 | Owens | 352—6 |
| 2,233,771 | 4/1941 | Comi. | |
| 2,322,489 | 6/1943 | Von Madaler | 352—6 |
| 2,382,470 | 8/1945 | Eakins. | |
| 2,434,200 | 1/1948 | Engelken | 352—8 |
| 2,483,040 | 9/1949 | El-Mazzaoui | 352—6 |
| 2,542,188 | 2/1951 | Gates | 352—7 |
| 2,590,956 | 4/1952 | Gille. | |
| 2,912,519 | 11/1959 | Simmons. | |
| 2,943,860 | 7/1960 | D'Arcy. | |

JULIA E. COINER, Primary Examiner

U.S. Cl. X.R.

352—37